July 31, 1928.
M. SCUDDER
1,678,830
CASING FOR FOOTBALLS, BASKET BALLS, AND THE LIKE
Filed March 21, 1927
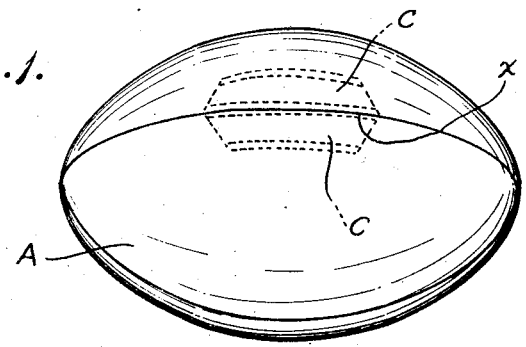
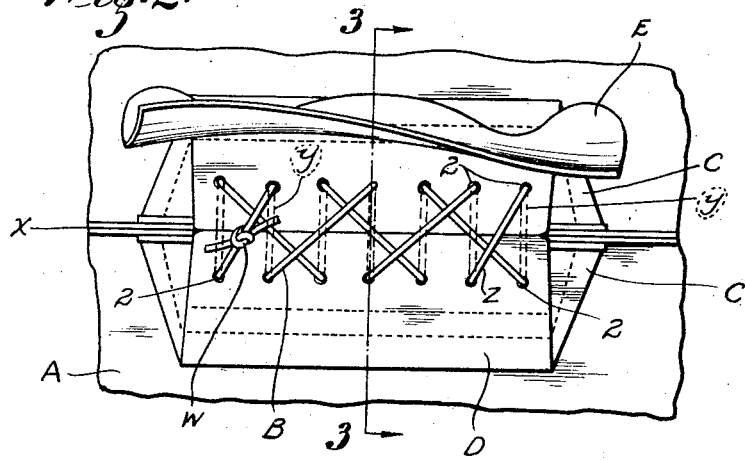
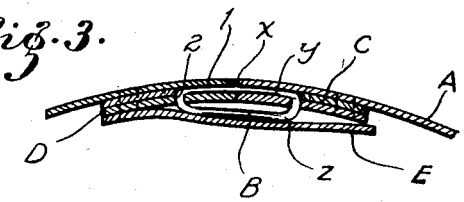
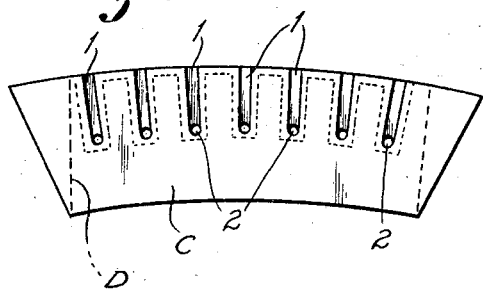
INVENTOR
MASON SCUDDER
By Bakewell Church
ATTORNEYS Patented July 31, 1928.

1,678,830

UNITED STATES PATENT OFFICE.

MASON SCUDDER, OF ST. LOUIS, MISSOURI, ASSIGNOR TO RAWLINGS MANUFACTURING COMPANY, OF ST. LOUIS, MISSOURI, A CORPORATION OF MISSOURI.

CASING FOR FOOTBALLS, BASKET BALLS, AND THE LIKE.

Application filed March 21, 1927. Serial No. 177,046.

This invention relates to footballs, basket balls, punching bags and similar articles of the type that are provided with a concealed lacing which holds the opposed edges of the slit in the casing tightly together.

The main object of my invention is to provide a basket ball or football of the general type mentioned, in which the portions of the casing at opposite sides of the slit in the casing are provided with a novel means that co-operates with the lacing to prevent said portions from puckering and for insuring said portions remaining in abutting relationship with the outside faces of same flush with each other.

To this end I have devised a casing for footballs and the like, that is provided with a slit through which the bladder is introduced into and removed from the casing, and a concealed lacing arranged on the inside of the casing and comprising numerous portions disposed crosswise of the slit in the casing that are combined with means arranged on the inner side of the casing at opposite sides of said slit and constructed so that the lacing will hold opposed portions of the casing in abutting relationship and free from wrinkles or puckers. The means referred to is preferably formed by members attached to the inner side of the opposed portions of the casing and provided with holes through which the lacing passes and also with registering channels of novel construction that receive the portions of the lacing which extend crosswise of the slit in the casing.

Figure 1 is a perspective view of a football constructed in accordance with my invention.

Figure 2 is an enlarged inside view of the casing, illustrating how the lacing is combined with the means or members arranged on the inside of the casing at opposite sides of the slit in the casing.

Figure 3 is a sectional view, taken on the line 3—3 of Figure 2; and

Figure 4 is a top plan view of one of the stays that is attached to the inner side of the casing at one side of the slit in the casing.

Referring to the drawings which illustrate the preferred form of my invention, A designates the casing of a football, basket ball or the like, which is provided with the usual slit $x$ through which the bladder (not shown) is introduced into and removed from the casing. The opposed portions of the casing at opposite sides of the slit $x$ are held tightly together in abutting relationship by a concealed lacing B that co-operates with means or members attached to the inner sides of the opposed portions of the casing at opposite sides of the slit $x$. Said means or members can be constructed in various ways without departing from the spirit of my invention, but in the preferred form of my invention herein illustrated the opposed portions of the casing have attached to the inner sides of same, members which are provided with registering passageways or channels that are disposed at an angle to the slit $x$ in the casing, and the lacing B comprises numerous portions that extend cross-wise of the slit $x$ through the passageways or channels in said members. At the inner ends of said passageways or channels are holes through which the lacing passes, as shown in Figure 2 of the drawings. Preferably, the member, or means above referred to are formed by two stays C, constructed from leather or some other suitable material, attached to the inner side of the opposed portions of the casing at opposite sides of the slit $x$ by stitches or in any other suitable manner, and each provided with a plurality of slots 1 that extend inwardly from the abutting edges of said stays, as shown in Figure 4. Each of said stays C has an element or member D superimposed upon same and secured thereto by stitches or in any other suitable way, and holes 2 are formed in the elements D at the inner ends of the slots 1, so as to receive the lacing.

The elements D and the stays C co-operate with each other to form lace-receiving members at opposite sides of the slit $x$ that are of greater thickness than the lacing and which have channels for receiving the portions $y$ of the lacing that extend crosswise of the slit, as shown in broken lines in Figure 2, each of said passageways or channels being provided at its inner end with a hole 2 through which the lacing can pass, thereby permitting the lacing to be combined with said members in such a way that portions $y$ of the lacing extend transversely across the top side of the members D, and portions $z$ of the lacing extend transversely across the underside of said members D, as shown in full lines in Figure 2. The holes 2 in the members D are arranged some distance inwardly from the abutting edges of said members D which terminate flush with the slit $x$ in the casing, thereby insuring the lacing being combined with the members attached to the inner sides of the opposed portions of the casing in such a way as to hold the edges of the opposed portions of the casing tightly together. In view of the fact that the channels or passageways through which the lacing passes are formed in members that are of greater thickness than the lacing, said members will retain their original flat shape, and consequently, will co-operate with the lacing to hold the opposed portions of the casing substantially flush with each other, free from wrinkles and puckers. Preferably, an inner flap of leather or some other suitable material E, is attached to the inside of the casing in such a way that it folds over the lacing B after said lacing has been tightened, thus preventing the lacing from rubbing against the bladder of the ball.

A lacing tool is used to thread the lacing B through the channels or passageways formed in the members or means attached to the inner side of the casing at opposite sides of the slit in the casing through which the bladder is inserted and removed, it being, of course, understood that the lacing is installed when the bladder is deflated. In the operation of installing the lacing the opposed portions of the casing at opposite sides of the slit $x$ are separated sufficiently to permit the lacing tool to be inserted in the casing when the lacing is being forced through the holes 2 in the members D and through the channels or passageways formed by the slots 1 in the stays C. After the lacing has been passed through all of the holes 2 provided for same, the lacing is drawn taut and the end portions of the lacing, which are then located on the outside of the casing, are then tied together, so as to form a knot $w$ which subsequently is pushed inwardly through the slit $x$ in the casing and through the joint between the members on the inside of the casing through which the lacing passes, as shown in Figure 2.

With the casing of the construction above described, the edges of the opposed portions of the casing at opposite sides of the slit through which the bladder is inserted and removed, are held pressed tightly together, free from wrinkles and puckers, and with the outer surfaces of said opposed portions substantially flush, the lacing B being completely concealed and arranged entirely on the inside of the casing. The members or means on the inner side of the casing through which the lacing passes are of such construction that the lacing is not liable to tear the same, and the lacing can be easily combined with said members.

Having thus described my invention, what I claim as new and desire to secure by Letters Patent is:

1. A casing for footballs, basket balls and the like provided with a slit, stays attached to the inner side of the opposed portions of the casing at the opposite sides of said slit and provided with slots for receiving portions of a concealed lacing that extend crosswise of the slit, and members superimposed upon and attached to said stays so as to co-operate with said slots to form channels for the lacing, said members being provided with holes through which said lacing passes.

2. A casing for footballs, basket balls and the like provided with a slit, stays attached the inner side of the opposed portions of the casing at opposite sides of said slit and provided with slots disposed transversely of the slit and extending inwardly from the abutting edges of said stays, members superimposed upon and attached to said stays and provided with holes located at the inner ends of said slots, and a lacing concealed by the opposed portions of the casing and arranged so as to lie in said slots between the casing and the members superimposed upon said stays.

3. A casing for footballs, basket balls and the like provided with a slit, leather stays attached to the inner side of the casing at opposite sides of said slit and provided with numerous registering slots that are disposed at substantially right angles to the slit, members combined with said stays so as to co-operate with the slots in same to form channels, holes in said members at the inner ends of said channels, a lacing that passes through said holes and which comprises numerous portions disposed crosswise of the slit and arranged in said channels, and an inner flap for preventing said lacing from rubbing on the bladder of the ball.

4. A casing for footballs, basket balls and the like provided with a slit, a concealed lacing comprising numerous portions disposed crosswise of said slit, and reinforcing devices on the inner side of the casing attached to the portions of the casing at the opposite sides of said slit and provided with channels for receiving said lacing, said reinforcing devices being of greater thickness than said lacing.

5. A casing for footballs, basket balls and the like provided with a slit, a concealed lacing comprising portions disposed crosswise of said slit, and reinforcing devices on the inner side of the casing attached to the portions of the casing located at opposite sides of said slit and provided with channels and holes through which the lacing passes, said channels being formed by slots or grooves in the top faces of said reinforcing devices that contact with the inner side of the casing.

MASON SCUDDER.